E. McGLINCHAY.
DEVICE FOR TRANSPORTING AND WEIGHING BALED HAY.
APPLICATION FILED AUG. 17, 1908.
927,580.
Patented July 13, 1909.
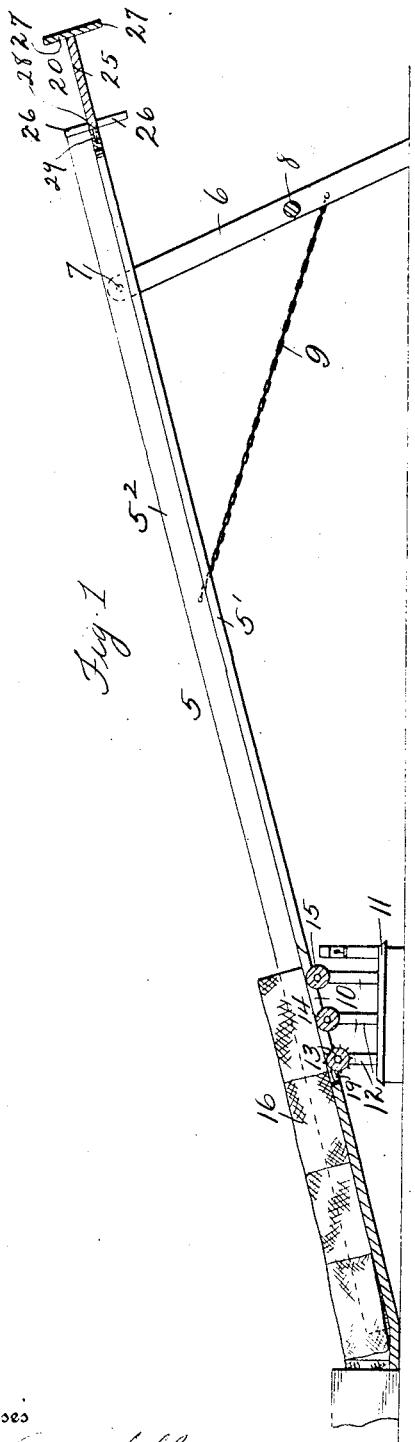
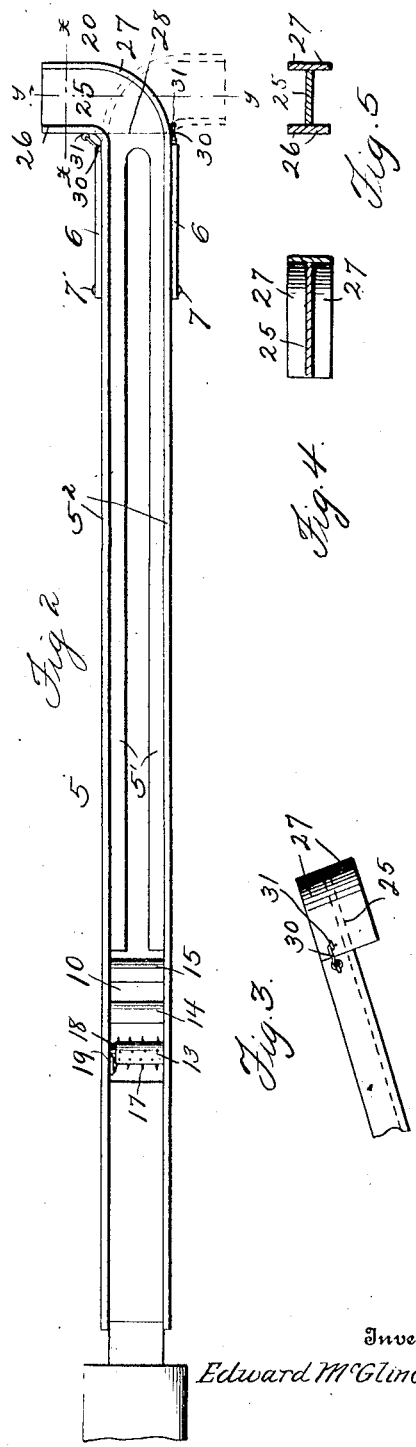
Witnesses
F. G. Campbell
A. L. Phelps
Inventor
Edward McGlinchay
By Chester S. Shepherd
Attorney

UNITED STATES PATENT OFFICE.

EDWARD McGLINCHAY, OF GALLOWAY, OHIO.

DEVICE FOR TRANSPORTING AND WEIGHING BALED HAY.

No. 927,580.　　　　Specification of Letters Patent.　　　Patented July 13, 1909.

Application filed August 17, 1908. Serial No. 448,966.

*To all whom it may concern:*

Be it known that I, EDWARD McGLINCHAY, a citizen of the United States, residing at Galloway, in the county of Franklin and State of Ohio, have invented certain new and useful Improvements in Devices for Transporting and Weighing Baled Hay, of which the following is a specification.

My invention relates to a device for transporting and weighing baled hay, and has for its object the provision of a device of this character constructed in such manner that it will receive the bales of hay from a hay baler and will transport said hay to any desired point, said hay being weighed in transit.

Further objects and advantages of the invention will be set forth in the detailed description which now follows:

In the accompanying drawing: Figure 1 is a longitudinal vertical section of the device comprising the present invention, Fig. 2 is a plan view thereof, Fig. 3 is a side elevation of the upper end of the conveying chute, Fig. 4 is a section upon line *y—y* of Fig. 2, and Fig. 5 is a section upon line *x—x* of Fig. 2.

Like numerals designate corresponding parts in all of the figures of the drawing.

Referring to the drawing, the numeral 5 designates a chute which has legs 6 pivotally connected thereto as at 7. A tie-rod 8 connects the legs and a chain 9, one end of which is connected to the lower portion of the legs, and the opposite end of which is connected to the sides of the chute, limits the movement of said legs and holds them in any desired position. It is apparent that by moving the legs to different positions, the height of the rear end of the chute 5 may be varied at will. The chute 5 comprises the bottom 5′ and side walls 5″. An opening 10 is formed in the bottom of the chute and a scale 11 is located beneath said opening. The platform of said scale is provided with a plurality of upwardly extending standards 12, with which are journaled rollers 13, 14 and 15. The bales of hay indicated at 16 are forced out of the hay baler in the usual manner, each bale forcing the bale ahead of it up the incline. As the bales pass over the rollers 13, 14 and 15, they may be weighed.

The roller 13 is preferably provided with teeth 17 and a ratchet wheel 18, said ratchet wheel being adapted to be engaged by a pawl 19 which is pivotally connected to the bottom 5′ of the chute. The movement of the hay baler to eject the bales of hay, is of course an intermittent one and by providing this toothed roller and ratchet wheel, rearward movement of the bale which rests upon the rollers is prevented, through a slight rearward movement of the bales between the bale which is to be weighed and the hay baler, may take place. This removes some of the friction of adjacent bales and renders a more accurate weighing of the bale possible.

This invention contemplates the use of a chute of any desired length and arranged to direct the bales in any desired direction. To direct the bales off to one side in either direction, the chute member 20 is provided. This member comprises the bottom 25, side walls 26 which project both above and below said bottom and curved side walls 27 which likewise project both above and below the bottom. The edge 28 of this chute section is provided with dowel pins 29 which enter openings formed in the upper edge of the bottom 5′ of the main chute. Hooks 30 of the main chute section, engage eyelets 31 carried by the chute section 20 to lock these parts together.

With the parts in the position illustrated in Fig. 1, the bales will be directed off toward the left from the chute. If it be desired to direct them off toward the right, the section 20 is inverted, thereby bringing the chute section 20 to the position illustrated in dotted lines in Fig. 1. Since the side walls of the chute section 20 project both above and below the bottom 20′ thereof, this may readily be done, it being understood that the means for maintaining the chute section 20 in position is the same in both cases.

From the foregoing description, it will be seen that simple and efficient means are herein provided for accomplishing the objects of the invention, but while the elements shown and described are well adapted to serve the purposes for which they are intended, it is to be understood that the invention is not limited to the exact construction set forth, but includes within its purview such changes as may be made within the scope of the appended claim.

What I claim, is:

A chute adapted to receive bales of hay directly from a hay baler, an opening formed in said chute, a weighing member located within said opening over which the bales pass as they travel through said chute, said weighing member comprising a plurality of rollers, a scale to which said rollers are connected, one of said rollers being toothed, and means for preventing reverse rotation of said toothed roller.

In testimony whereof I affix my signature in presence of two witnesses.

EDWARD McGLINCHAY.

Witnesses:
A. L. PHELPS,
L. CARL STOUGHTON.